(12) United States Patent
Kawamata

(10) Patent No.: US 10,274,229 B2
(45) Date of Patent: Apr. 30, 2019

(54) METHOD FOR COOLING COMPRESSED AIR AND APPARATUS THEREOF

(71) Applicant: Taiei Sangyo Co., Ltd., Yoshinogawa-shi, Tokushima (JP)

(72) Inventor: Hiroyasu Kawamata, Yoshinogawa (JP)

(73) Assignee: Taiei Sangyo Co., Ltd., Tokushima (JP)

( * ) Notice: Subject to any disclaimer, the term of this patent is extended or adjusted under 35 U.S.C. 154(b) by 383 days.

(21) Appl. No.: 15/063,629

(22) Filed: Mar. 8, 2016

(65) Prior Publication Data

US 2017/0241673 A1    Aug. 24, 2017

(30) Foreign Application Priority Data

Feb. 19, 2016    (JP) .................................. 2016-30494

(51) Int. Cl.
   *F25B 21/02*        (2006.01)
   *F25B 9/04*         (2006.01)
   (Continued)

(52) U.S. Cl.
   CPC .............. *F25B 9/04* (2013.01); *B01D 5/0093* (2013.01); *B01D 53/265* (2013.01);
   (Continued)

(58) Field of Classification Search
   CPC ................... F25B 9/04; F24F 2003/144; F24F 2003/1452; B01D 9/00; B01D 5/0093;
   (Continued)

(56) References Cited

U.S. PATENT DOCUMENTS 4,584,838 A * 4/1986 AbuJudom, II ........ F16L 55/09
                                                      62/401
6,158,237 A * 12/2000 Riffat ..................... B01D 3/007
                                                     165/92
(Continued)

FOREIGN PATENT DOCUMENTS

JP         10-235132     9/1998
JP         11-19461      1/1999
           (Continued)

*Primary Examiner* — Keith M Raymond
*Assistant Examiner* — Kamran Tavakoldavani
(74) *Attorney, Agent, or Firm* — Norris McLaughlin, P.A.

(57) ABSTRACT

A method and apparatus for cooling compressed air include the following. Compressed air is introduced into a vortex tube where cold air and warm air are generated. The cold air and warm air are introduced into a pressure vessel where the temperature and moisture of the compressed air are adjusted. The adjusted compressed air is fed to a downstream side of the pressure vessel. Before the generated cold air and warm air are introduced into the pressure vessel, the warm air is introduced into a pre-pressure vessel disposed at an upstream side of the pressure vessel. The cold air is introduced into a cooling tube or cooling chamber which is disposed inside the pre-pressure vessel which is disposed at the upstream side of the pressure vessel. The warm air is adjusted by cooling. The adjusted warm air is introduced into the pressure vessel from the pre-pressure vessel together with the cold air.

6 Claims, 9 Drawing Sheets

(51) Int. Cl.
  *B01D 5/00*    (2006.01)
  *B01D 53/26*   (2006.01)
  *F24F 3/14*    (2006.01)
  *B01D 53/00*   (2006.01)

(52) U.S. Cl.
  CPC ........ *B01D 53/002* (2013.01); *B01D 2257/80* (2013.01); *F24F 2003/1446* (2013.01)

(58) Field of Classification Search
  CPC .............. B01D 53/265; B01D 2257/80; B01D 53/002; B01D 2256/10; B01D 2256/12
  See application file for complete search history.

(56) References Cited

U.S. PATENT DOCUMENTS

2008/0136068 A1\* 6/2008 Leone ................... B29C 33/046
  264/520
2017/0248354 A1\* 8/2017 Lord ....................... F25B 39/02

FOREIGN PATENT DOCUMENTS

| JP | 11-193782  | 7/1999 |
| JP | 3020151    | 3/2000 |
| JP | 2007-175643 | 7/2007 |
| JP | 4789963    | 7/2011 |

\* cited by examiner

METHOD FOR COOLING COMPRESSED AIR AND APPARATUS THEREOF

BACKGROUND OF THE INVENTION

This invention relates to a method for cooling a compressed air and an apparatus thereof which is preferably used at the time when a large amount of high-temperature compressed air generated by an air compressor of a manufacturing factory or the like, for example, is fed to an air dryer, wherein a dried compressed-air having a low temperature obtained by effectively using warm air and cool air generated in a vortex tube and without using any refrigeration type air dryer is fed to the air dryer and after a favorable gas-liquid separation is achieved by the air dryer, the compressed air is fed to an air tool so that a possible occurrence of failure and functional reduction of the air tool can be prevented.

The compressed air ejected from an air compressor contains water and oil content mixed with each other. When this compressed air is fed to an air tool such as an air dryer, impact wrench, painting gun or the like, the inside of the air conduit is rusted or the component elements of the air tool are rusted, thereby causing the functional reduction and failure of the tool. In view of the above-mentioned problems, the outlet duct for the compressed air is provided with an air dryer as a gas-liquid separator so that the compressed air is separated into gas and liquid by the air dryer and the dried compressed air is fed to the air tool.

The air dryer is provided, for example, with an upper cover attached to the upper part of the hollow cylindrical body and communicated with the inside, a conduit forming a duct for the compressed air is screwed into the inlet passage and outlet passage which are formed in the both sides of the cover, a hollow cylindrical partition tube is disposed inside the hollow cylindrical body, and a plurality of partition members as a gas-liquid separation member are superimposed within the partition tube such that one partition member is placed on another.

Then, the compressed air introduced into the hollow cylindrical body from the inlet passage is guided to the lower side of the partition members and ejected from the throughhole, the condensed moisture owing to adiabatic expansion is discharged from a drain hole (not shown) formed in the lower end part of the hollow cylindrical body, and the moisture-removed dry air is discharged from the outlet passage and fed to the air tool side (for example, see Japanese Patent No. 4789963).

However, since the air dryer is inserted into the ejection duct for the compressed air and used in that condition and the ejection duct is installed in the indoor of the factory or the like, there are such problems that the installation space and the area where the air dryer is used are limited.

Moreover, it gives arise to additional such problems that even in the case where the air dryer is arranged on the upstream or intermediate-stream side of the ejection duct and the compressed air is separated into gas and liquid by the air dryer, the moisture is condensed again depending on the neighboring temperatures and mixed with the compressed air, and thus, the original gas-liquid separation state is decreased and the compressed air with the moisture mixed therewith is fed to the air tool, thus resulting in failure of the air tool and/or a situation where the air tool becomes unable to use. In the case where the air tool is a painting gun, it becomes unable to perform the predetermined painting and therefore, the painting gun becomes unable to use. Therefore, in order to separate the compressed air into gas and liquid effectively and accurately by using the air dryer, it is preferable that the cooled and dried compressed-air is fed to the air dryer.

In order to remove the above-mentioned problems, one attempt is made wherein, for example, the compressed air of the air compressor is fed to a refrigeration type air dryer. This refrigeration type air dryer is constructed such that a refrigerating circuit comprising a compressor, a condenser and a cooling device is installed inside an air dryer body, and the compressed air is fed into the cooling chamber where the compressed air is cooled and dried (for example, see Japanese Patent Application Laid-Open No. 1998-235132 and Japanese Patent No. 3020151).

However, since the refrigeration type air dryer is expensive and requires a high installation cost and in addition, the refrigeration type air dryer is always driven at the time when the air tool is in use, it gives rise to such a problem that the operating cost becomes enormous.

In order to solve the above-mentioned problem, an air dryer is known, wherein a first and second heat exchanger forming a refrigeration circuit are arranged inside the air dryer, a coolant is fed to those heat exchangers, the cooling water introduced to the first heat exchanger is cooled and introduced to the second heat exchanger, compressed air is introduced to the second heat exchanger and the compressed air is cooled by the cooling water (for example, see Japanese Patent Application Laid-Open No. 1999-19461).

However, it gives rise to such a problem, among others, that since this air dryer is required to cool the cooling water, a refrigeration circuit including a first and second heat exchanger is required and the equipment cost and operational cost become enormous.

Another type of equipment is also known as another means for water cooing the compressed air, in which a compressed air tube for introducing compressed air of an air compressor is arranged in a cooling water tub, a water cooling type aftercooler is disposed at a bottom part of the cooling water tub, the compressed air is introduced to the aftercooler and cooled, the cooled compressed air is a refrigeration type air dryer, and the compressed air is further cooled (for example, see Japanese Patent Application Laid-Open No. 1999-193782).

However, this equipment has such a problem that since a refrigeration type air dryer is required in addition to the water cooling type aftercooler, the installation cost becomes enormous, long time is required for cooling the compressed air, and operational cost thereof is increased.

In order to solve the above problem, another prior art is known as an apparatus and method for generating a dried air to be used for cleaning a substrate, such as a semiconductor wafer, which comprises a compressed air generator for generating a compressed air, a vortex tube for generating a cold air and warm air by the generated compressed air, a vessel connected to the vortex tube and receiving the cold air sent from the vortex tube, and a heater for heating the cold air received in the vessel, and in which the heater is connected to the vortex tube, the cold air received in the vessel is heated to a normal temperature using the warm air sent from the vortex tube, and the normal temperature air is introduced to a substrate processing chamber (for example, see Japanese Patent Application Laid-Open No. 2007-175643).

However, it gives rise to such a problem that although the vortex tube can easily obtain cold air, it is expensive and since the amount of air ejected from the vortex tube is generally small, it is unable to meet the manufacturing factory where a large amount of compressed air is used.

Moreover, the vortex tube has such additional problem that since it is necessary to operate continuously the compressor in order to obtain the cold air, electricity charges become enormous.

Moreover, since the cold air side connection tube and the warm air side connection tube for connecting the vortex tube and the buffer are exposed inside the dry air generator, it gives rise to such a problem that because of the poor thermal efficiency in the buffer, a stable compressed air having a normal temperature is difficult to obtain, and in addition, in spite of the fact that the connection tube on the warm air side is decreased in temperature and the temperature of the warm air gradually approaches the dew point, the warm air now having a decreased temperature is directly brought to the buffer, thereby making it difficult to obtain a sufficiently dried dry air.

SUMMARY OF THE INVENTION

It is an object of the present invention to provide, in order to solve the above-mentioned problems, a method and apparatus for cooling a compressed air which is preferably used at the time when a large amount of high-temperature compressed air generated by an air compressor of a manufacturing factory or the like, for example, is fed to an air dryer, wherein a dried compressed-air having a low temperature obtained by effectively using warm air and cool air generated in a vortex tube and without using any refrigeration type air dryer is fed to the air dryer and after a favorable gas-liquid separation is achieved by the air dryer, the compressed air is fed to an air tool so that a possible occurrence of failure and functional reduction of the air tool can be prevented.

The invention in its principal aspect comprises the step of introducing generated compressed air into a vortex tube for generating a cold air and warm air, the step of introducing the cold air and warm air into a pressure vessel and adjusting the temperature and moisture of the compressed air and the step of feeding such adjusted compressed air to a downstream side of the pressure vessel, wherein before the generated cold air and warm air are introduced into the pressure vessel, the warm air is introduced into a pre-pressure vessel disposed at an upstream side of the pressure vessel, the cold air is introduced into a cooling tube or cooling chamber which is disposed inside the pre-pressure vessel, the warm air is adjusted by cooling and the adjusted warm air is introduced into the pressure vessel from the pre-pressure vessel together with the cold air. Thus, the warm air introduced to the pre-pressure vessel is changed into a weak cold air by cooling, a rational and effective use of the warm air generated in the vortex tube is achieved, a low temperature and stable compressed air having a uniform and even temperature distribution is obtained within the pressure vessel compared with the case where the cold air and warm air generated in the vortex tub is directly introduced to the pressure vessel and such obtained compressed air is fed toward the downstream side of the pressure vessel.

According to a second aspect of the invention, water vapor in the warm air within the pre-pressure vessel is condensed on a surface of the cooling tube or cooling chamber with cold air introduced therein so that the water vapor is dehumidified, such dehumidified warm air is introduced into the pressure vessel from the pre-pressure vessel together with the cold air, and the compressed air adjusted in the pressure vessel is fed toward the downstream side. Thus, a rational and effective use of the warm air generated in the vortex tube is achieved, a low temperature, uniform, even and stable dehumidified or dried compressed air is obtained within the pressure vessel compared with the case where the cold air and warm air generated in the vortex tub is directly introduced to the pressure vessel and such obtained compressed air is fed toward the downstream side of the pressure vessel so that the air tool is prevented from failure and functional reduction.

According to a third aspect of the invention, an air dryer is disposed at a downstream side of the pressure vessel. Thus, the dried compressed air having a low temperature is fed to the air dryer so that a purified compressed air having a good quality is fed to the air tool.

According to a fourth aspect of the invention, the cooling tube is arranged in the form of a coil within the pre-pressure vessel so that the warm air can be cooled by the cooling tube. Thus, an elongation of the cooling tube is achieved, the cooling performance of the warm air within the pre-pressure vessel and the condensing performance of the water vapor in the warm air are enhanced, and a stable dried air having a low temperature is obtained.

According to a fifth aspect of the invention, water vapor in the warm air is condensed on a surface of a trap fin which is disposed at an outer peripheral surface of the cooling tube so that the water vapor can be dehumidified. Thus, the capability of the trap fin for capturing the water vapor in the warm air is enhanced, and a stable dried compressed air having a low temperature is obtained.

According to a sixth aspect of the invention, water vapor in the warm air is condensed on surfaces of a plurality of flat cooling chambers which are disposed inside the pre-pressure vessel by the flat cooling chambers so that the water vapor is dehumidified. Thus, the capability of the cooling chamber for capturing the water vapor in the warm air is enhanced, and a stable dried compressed air having a low temperature is obtained.

According to a seventh aspect of the invention, the warm air is cooled by a heat radiating fin disposed at an outer peripheral surface of a warm air conduit disposed between a warm air side outlet port of the vortex tube and the pre-pressure vessel. Thus, the warm air is cooled rationally and efficiently.

According to an eighth aspect of the invention, the vortex tube, the pre-pressure vessel with the cooling tube or cooling chamber disposed therein, and a cold air conduit and a warm air conduit disposed between a cold air side outlet port and a warm air side outlet port of the pre-pressure vessel and the vortex tube are immersed in a cooling tank containing a coolant and cooled therein. Thus, the cooling of the warm air moving through the various component members is performed rationally and efficiently so that the dried compressed air having a low temperature is fed to the air dryer or air tool.

According to a ninth aspect of the invention, a plurality of vortex tubes are connected in parallel relation to a feeding side of generated compression air, the compressed air is introduced into the respective vortex tubes, a cold air and warm air generated in the respective vortex tubes are converged respectively, such converged cold air is introduced into the cooling tube or cooling chamber disposed inside the pre-pressure vessel, and such converged warm air is introduced into the pre-pressure vessel. Thus, the movement of the warm air through the cooling tube or cooling chamber is performed rationally and efficiently, the dried compressed air having a low temperature is fed to the air dryer or air tool, the introduction, cooling and dehumidification or drying of a large amount of compressed air are realized, so that the requirement for the use of a large amount of compressed air is satisfied.

According to a tenth aspect of the invention, an apparatus for cooling a compressed air comprises an air compressor adapted to generate a compressed air, and a vortex tube adapted to generate a cold air and warm air by the compressed air delivered from the air compressor, adjusted compressed air being feedable toward a downstream side of the pressure vessel, wherein a pre-pressure vessel communicated with the vortex tube is disposed at an upstream side of the pressure vessel, a cooling tube or cooling chamber communicated with a cold air outlet port and a warm air outlet port of the vortex tube is disposed inside the pre-pressure vessel such that the generated cold air can be fed into the cooling tube or cooling chamber, the generated warm air can be introduced into the pre-pressure vessel, the warm air can be adjusted by cooling, and the adjusted warm air can be introduced into the pressure vessel from the pre-pressure vessel together with the cold air. Thus, the warm air introduced to the pre-pressure vessel is changed into a weak cold air by cooling, a rational and effective use of the warm air generated in the vortex tube is achieved, a low temperature and stable compressed air having a uniform and even temperature distribution is obtained within the pressure vessel compared with the case where the cold air and warm air generated in the vortex tub is directly introduced to the pressure vessel and such obtained compressed air is fed toward the downstream side of the pressure vessel.

According to an eleventh aspect of the invention, water vapor contained in warm air within the pre-pressure vessel is condensed on a surface of the cooling tube or cooling chamber so that the water vapor can be dehumidified, the dehumidified cooled warm air is introduced into the pressure vessel from the pre-pressure vessel together with the cold air, and the compressed air adjusted by the pressure vessel is fed to a downstream side. Thus, a rational and effective use of the warm air generated in the vortex tube is achieved, a low temperature, uniform, even and stable dehumidification or drying effect is obtained within the pressure vessel compared with the case where the cold air and warm air generated in the vortex tub is directly introduced to the pressure vessel and such obtained compressed air is fed toward the downstream side of the pressure vessel so that the air tool is prevented from failure and functional reduction.

According to a twelfth aspect of the invention, an air dryer is disposed at a downstream side of the pre-pressure vessel. Thus, the dried compressed air having a low temperature is fed to the air dryer so that a purified compressed air having a good quality is fed to the air tool.

According to a thirteenth aspect of the invention, the cooling tube is arranged in the form of a coil within the pre-pressure vessel so that the warm air can be cooled by the cooling tube. Thus, an elongation of the cooling tube is achieved, the cooling performance of the warm air within the pre-pressure vessel and the condensing performance of the water vapor in the warm air are enhanced, and a stable dried air having a low temperature is obtained.

According to a fourteenth aspect of the invention, water vapor in the warm air is condensed on a surface of a trap fin which is disposed at an outer peripheral surface of the cooling tube so that the water vapor can be dehumidified. Thus, the capability of the trap fin for capturing the water vapor in the warm air is enhanced, and a stable dried compressed air having a low temperature is obtained.

According to a fifteenth aspect of the invention, a plurality of flat cooling chambers are disposed inside the pre-pressure vessel and water vapor in the warm air is condensed on a surface of the cooling chamber so that the water vapor can be dehumidified. Thus, an elongation of the cooling tube is achieved, the cooling performance of the warm air within the pre-pressure vessel and the condensing performance of the water vapor in the warm air are enhanced, and a stable dried air having a low temperature is obtained.

According to a sixteenth aspect of the invention, a heat radiating fin is disposed at an outer peripheral surface of a warm air conduit disposed between a warm air outlet port of the vortex tube and the pre-pressure vessel so that the warm air can be cooled by the heat radiating fin. Thus, the warm air is cooled rationally and efficiently.

According to a seventeenth aspect of the invention, the vortex tube, the pre-pressure vessel with the cooling tube or cooling chamber disposed therein, and a cold air conduit and a warm air conduit disposed between a cold air side outlet port and a warm air side outlet port of the pre-pressure vessel and the vortex tube are immersed in a cooling tank containing a coolant and cooled therein. Thus, the cooling of the warm air moving through the various component members is performed rationally and efficiently so that the dried compressed air having a low temperature is fed to the air dryer or air tool.

According to an eighteenth aspect of the invention, a plurality of vortex tubes are connected in parallel relation to a feeding side of generated compression air so that the compressed air can be introduced into the respective vortex tubes, a cold air and warm air generated in the respective vortex tubes can be converged respectively, such converged cold air is introduced into the cooling tube or cooling chamber disposed inside the pre-pressure vessel, and such converged warm air can be introduced into the pre-pressure vessel. Thus, the movement of the warm air through the cooling tube or cooling chamber is performed rationally and efficiently, the dried compressed air having a low temperature is fed to the air dryer or air tool, the introduction, cooling and dehumidification or drying of a large amount of compressed air are realized, so that the requirement for the use of a large amount of compressed air is satisfied.

According to a nineteenth aspect of the invention, the vortex tube comprises a plurality of vortex tubes each having the same or different capability. Thus, a suitable vortex tube is selected and used depending on the using conditions of the generated compressed air.

The invention in its principal aspect comprises the step of introducing generated compressed air into a vortex tube for generating a cold air and warm air, the step of introducing the cold air and warm air into a pressure vessel and adjusting the temperature and moisture of the compressed air and the step of feeding such adjusted compressed air to a downstream side of the pressure vessel, wherein before the generated cold air and warm air are introduced into the pressure vessel, the warm air is introduced into a pre-pressure vessel disposed at an upstream side of the pressure vessel, the cold air is introduced into a cooling tube or cooling chamber which is disposed inside the pre-pressure vessel, the warm air is adjusted by cooling and the adjusted warm air is introduced into the pressure vessel from the pre-pressure vessel together with the cold air. By virtue of the foregoing arrangement, the warm air introduced to the pre-pressure vessel can changed into a weak cold air by cooling, a rational and effective use of the warm air generated in the vortex tube can be achieved, a low temperature and stable compressed air having a uniform and even temperature distribution can be obtained within the pressure vessel compared with the case where the cold air and warm air generated in the vortex tub is directly introduced to the pressure vessel and such obtained compressed air is fed toward the downstream side of the pressure vessel.

According to the second aspect of the invention, water vapor in the warm air within the pre-pressure vessel is condensed on a surface of the cooling tube or cooling chamber with cold air introduced therein so that the water vapor is dehumidified, such dehumidified warm air is introduced into the pressure vessel from the pre-pressure vessel together with the cold air, and the compressed air adjusted in the pressure vessel is fed toward the downstream side. By virtue of the foregoing arrangement, a rational and effective use of the warm air generated in the vortex tube can achieved, a low temperature, uniform, even and stable dehumidified or dried compressed air can be obtained within the pressure vessel compared with the case where the cold air and warm air generated in the vortex tub is directly introduced to the pressure vessel and such obtained compressed air is fed toward the downstream side of the pressure vessel so that the air tool can be prevented from failure and functional reduction.

According to a third aspect of the invention, an air dryer is disposed at a downstream side of the pressure vessel. By virtue of the foregoing arrangement, the dried compressed air having a low temperature is fed to the air dryer so that a purified compressed air having a good quality can be fed to the air tool.

According to the fourth aspect of the invention, the cooling tube is arranged in the form of a coil within the pre-pressure vessel so that the warm air can be cooled by the cooling tube. By virtue of the foregoing arrangement, an elongation of the cooling tube can be achieved, the cooling performance of the warm air within the pre-pressure vessel and the condensing performance of the water vapor in the warm air can be enhanced, and a stable dried air having a low temperature can be obtained.

According to a fifth aspect of the invention, water vapor in the warm air is condensed on a surface of a trap fin which is disposed at an outer peripheral surface of the cooling tube so that the water vapor can be dehumidified. By virtue of the foregoing arrangement, the capability of the trap fin for capturing the water vapor in the warm air can be enhanced, and a stable dried compressed air having a low temperature can be obtained.

According to a sixth aspect of the invention, water vapor in the warm air is condensed on surfaces of a plurality of flat cooling chambers which are disposed inside the pre-pressure vessel by the flat cooling chambers so that the water vapor is dehumidified. By virtue of the foregoing arrangement, the capability of the cooling chamber for capturing the water vapor in the warm air can be enhanced, and a stable dried compressed air having a low temperature can be obtained.

According to the seventh aspect of the invention, the warm air is cooled by a heat radiating fin disposed at an outer peripheral surface of a warm air conduit disposed between a warm air side outlet port of the vortex tube and the pre-pressure vessel. By virtue of the foregoing arrangement, the warm air can be cooled rationally and efficiently.

According to an eighth aspect of the invention, the vortex tube, the pre-pressure vessel with the cooling tube or cooling chamber disposed therein, and a cold air conduit and a warm air conduit disposed between a cold air side outlet port and a warm air side outlet port of the pre-pressure vessel and the vortex tube are immersed in a cooling tank containing a coolant and cooled therein. By virtue of the foregoing arrangement, the cooling of the warm air moving through the various component members can be performed rationally and efficiently so that the dried compressed air having a low temperature can be fed to the air dryer or air tool.

According to a ninth aspect of the invention, a plurality of vortex tubes are connected in parallel relation to a feeding side of generated compression air, the compressed air is introduced into the respective vortex tubes, a cold air and warm air generated in the respective vortex tubes are converged respectively, such converged cold air is introduced into the cooling tube or cooling chamber disposed inside the pre-pressure vessel, and such converged warm air is introduced into the pre-pressure vessel. By virtue of the foregoing arrangement, the movement of the warm air through the cooling tube or cooling chamber can be performed rationally and efficiently, the dried compressed air having a low temperature can be fed to the air dryer or air tool, the introduction, cooling and dehumidification or drying of a large amount of compressed air are realized, so that the requirement for the use of a large amount of compressed air can be satisfied According to the tenth aspect of the invention, an apparatus for cooling a compressed air comprises an air compressor adapted to generate a compressed air, and a vortex tube adapted to generate a cold air and warm air by the compressed air delivered from the air compressor, adjusted compressed air being feedable toward a downstream side of the pressure vessel, wherein a pre-pressure vessel communicated with the vortex tube is disposed at an upstream side of the pressure vessel, a cooling tube or cooling chamber communicated with a cold air outlet port and a warm air outlet port of the vortex tube is disposed inside the pre-pressure vessel such that the generated cold air can be fed into the cooling tube or cooling chamber, the generated warm air can be introduced into the pre-pressure vessel, the warm air can be adjusted by cooling, and the adjusted warm air can be introduced into the pressure vessel from the pre-pressure vessel together with the cold air. By virtue of the foregoing arrangement, the warm air introduced to the pre-pressure vessel can be changed into a weak cold air by cooling, a rational and effective use of the warm air generated in the vortex tube can be achieved, a low temperature and stable compressed air having a uniform and even temperature distribution can be obtained within the pressure vessel compared with the case where the cold air and warm air generated in the vortex tub is directly introduced to the pressure vessel and such obtained compressed air is fed toward the downstream side of the pressure vessel.

According to the eleventh aspect of the invention, water vapor contained in warm air within the pre-pressure vessel is condensed on a surface of the cooling tube or cooling chamber so that the water vapor can be dehumidified, the dehumidified cooled warm air is introduced into the pressure vessel from the pre-pressure vessel together with the cold air, and the compressed air adjusted by the pressure vessel is fed to a downstream side. By virtue of the foregoing arrangement, a rational and effective use of the warm air generated in the vortex tube can be achieved, a low temperature, uniform, even and stable dehumidification or drying effect can be obtained within the pressure vessel compared with the case where the cold air and warm air generated in the vortex tub is directly introduced to the pressure vessel and such obtained compressed air can be fed toward the downstream side of the pressure vessel so that the air tool is prevented from failure and functional reduction.

According to the twelfth aspect of the invention, an air dryer is disposed at a downstream side of the pre-pressure vessel. By virtue of the foregoing arrangement, the dried compressed air having a low temperature can be fed to the air dryer so that a purified compressed air having a good quality is fed to the air tool.

According to the thirteenth aspect of the invention, the cooling tube is arranged in the form of a coil inside the pre-pressure vessel so that the warm air can be cooled by the cooling tube. By virtue of the foregoing arrangement, an elongation of the cooling tube can be achieved, the cooling performance of the warm air within the pre-pressure vessel and the condensing performance of the water vapor in the warm air can be enhanced, and a stable dried air having a low temperature can be obtained.

According to the thirteenth aspect of the invention, water vapor in the warm air is condensed on a surface of a trap fin which is disposed at an outer peripheral surface of the cooling tube so that the water vapor can be dehumidified. By virtue of the foregoing arrangement, the capability of the trap fin for capturing the water vapor in the warm air can be enhanced, and a stable dried compressed air having a low temperature can be obtained.

According to the fifteenth aspect of the invention, a plurality of flat cooling chambers are disposed inside the pre-pressure vessel and water vapor in the warm air is condensed on a surface of the cooling chamber so that the water vapor can be dehumidified. By virtue of the foregoing arrangement, an elongation of the cooling tube can be achieved, the cooling performance of the warm air within the pre-pressure vessel and the condensing performance of the water vapor in the warm air can be enhanced, and a stable dried air having a low temperature can be obtained.

According to the sixteenth aspect of the invention, a heat radiating fin is disposed at an outer peripheral surface of a warm air conduit disposed between a warm air outlet port of the vortex tube and the pre-pressure vessel so that the warm air can be cooled by the heat radiating fin. By virtue of the foregoing arrangement, the warm air can be cooled rationally and efficiently.

According to the seventeenth aspect of the invention, the vortex tube, the pre-pressure vessel with the cooling tube or cooling chamber disposed therein, and a cold air conduit and a warm air conduit disposed between a cold air side outlet port and a warm air side outlet port of the pre-pressure vessel and the vortex tube are immersed in a cooling tank containing a coolant and cooled therein. By virtue of the foregoing arrangement, the cooling of the warm air moving through the various component members can be performed rationally and efficiently so that the dried compressed air having a low temperature can be fed to the air dryer or air tool.

According to the eighteenth aspect of the invention, a plurality of vortex tubes are connected in parallel relation to a feeding side of generated compression air so that the compressed air can be introduced into the respective vortex tubes, a cold air and warm air generated in the respective vortex tubes can be converged respectively, such converged cold air is introduced into the cooling tube or cooling chamber disposed inside the pre-pressure vessel, and such converged warm air can be introduced into the pre-pressure vessel. By virtue of the foregoing arrangement, the movement of the warm air through the cooling tube or cooling chamber can be performed rationally and efficiently, the dried compressed air having a low temperature can be fed to the air dryer or air tool, the introduction, cooling and dehumidification or drying of a large amount of compressed air can be realized, so that the requirement for the use of a large amount of compressed air can be satisfied According to the nineteenth aspect of the invention, the vortex tube comprises a plurality of vortex tubes each having the same or different capability. By virtue of the foregoing arrangement, a suitable vortex tube can be selected and used depending on the using conditions of the generated compressed air.

BEST MODE FOR CARRYING OUT THE INVENTION

Detailed Description of the Invention

Figure 1:
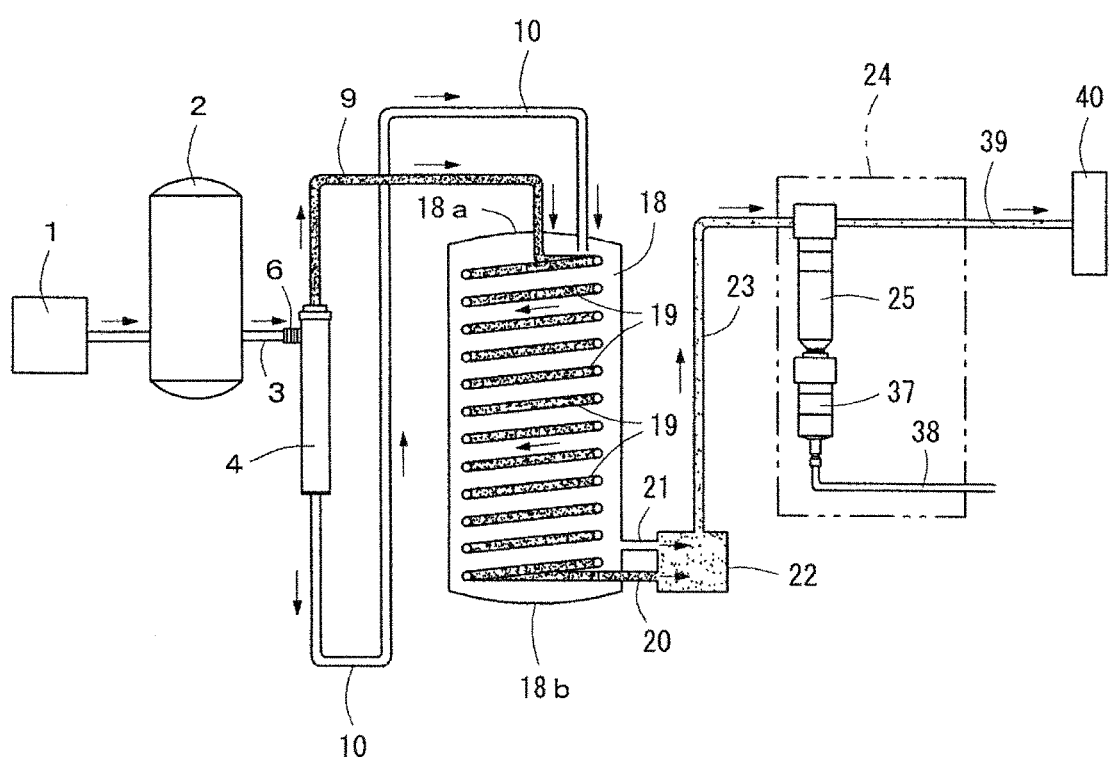
FIG. 1 is a front view showing, partly in section, the outline of a compressed air cooling device to which the present invention is applied.
Figure 2:
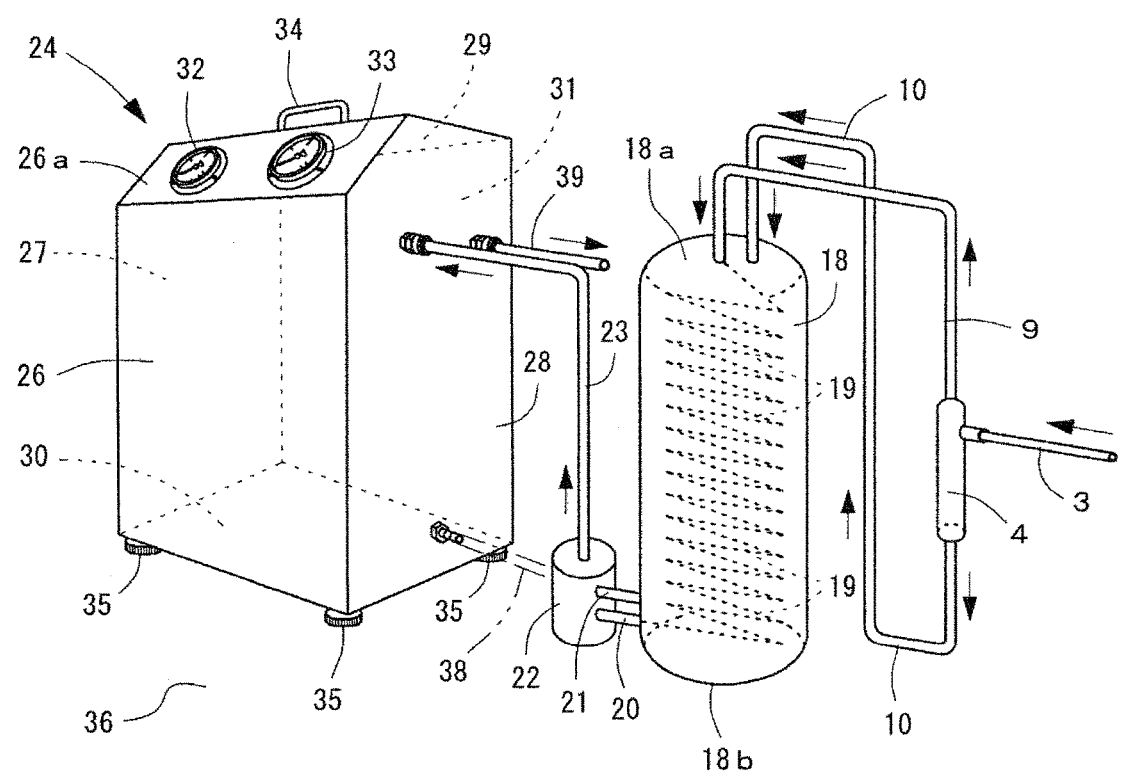
FIG. 2 is a perspective view showing the outline of the cooling device of FIG. 1.
Figure 3:
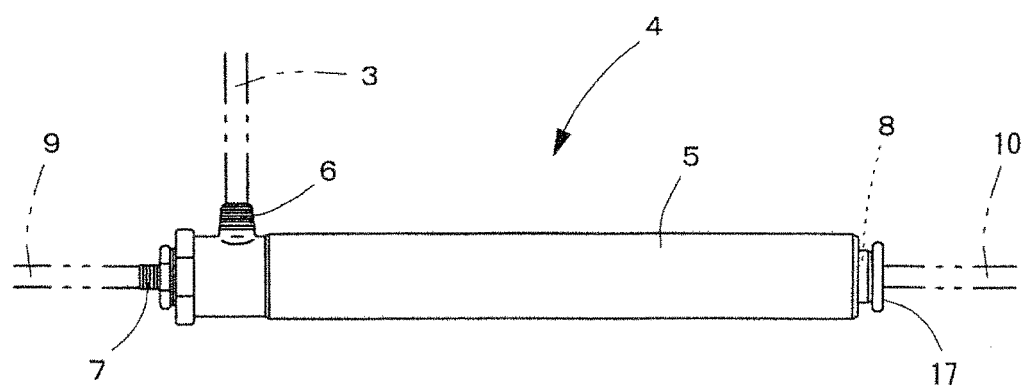
FIG. 3 is an enlarged front view showing a vortex tube which is applied to the present invention.

One embodiment of the present invention will now be described, in which the present invention is applied to cooling or drying compressed air which is supplied to an air dryer as a gas-liquid separator. In FIGS. 1 through 4, reference numeral 1 denotes an air compressor as a compressed air generator and 2 denotes an air tank for storing the compressed air generated by the air compressor 1. A compressed air conduit 3 is connected to an outlet port side of the air tank 2, and a vortex tube 4 as a coolant is connected to the other end of the air tank 2. In this embodiment, compressed air of 0.7 Mpa, which is often used in production factories, is generated by the air compressor 1 and introduced into the vortex tube 4 from the air tank 2.

The vortex tube 4 is formed in a hollow cylindrical shape. A tube body 5 of the vortex tube 4 is provided at one peripheral surface thereof with a projecting conduit connection part 6 to which the compressed air conduit 3 can be connected. The tube body 5 is provided at both sides thereof with a cold air outlet port 7 and a warm air outlet port 8. The outlet ports 7, 8 are connected with one end of the cold air conduit 9 and one end of the warm air conduit 10, respectively. The other end of the cold air conduit 9 and the other end of the warm air conduit 10 are connected to a pre-pressure vessel as later described.

The vortex tube 4 adopted in this embodiment has an outer diameter of about 4 cm, a length of about 27 cm and a weight of about 1.5 kg through 2.0 kg.

A generator 11 for generating an air vortex is disposed inside the tube body 5 in a position capable of communicating with the compressed air conduit 3. A cold air chamber 12 and a warm air chamber 13 are disposed at both sides of the generator 11.

The cold air chamber 12 functions as a moving passage for a cold air flow 14, while the warm air chamber 13 functions as a vortex passage for the vortex flow generated by the generator 11. The vortex flow is moved through this passage toward the warm air outlet port 8 side in a swirling manner and at a high speed. The vortex flow is compressed against the inner wall of the warm air chamber 13 and turned by centrifugal force at the swirling time to rapidly increase the pressure and density, thereby increasing the temperature so that a high temperature warm air flow 15 can be moved toward the warm air outlet port 8 side.

An opening and closing valve 16 is disposed at the warm air outlet port 8 such that the degree of opening of the valve 10 can be adjusted by a handle 17. By this adjusting operation, the outflow amount of the warm air flow 15 from the warm air outlet port 16 is adjusted so that a part of the air within the tube body 5 can be flowed out.

The vortex tube 4 used in this embodiment has a cold wind rate of 80% that is a rate between an inlet air amount and an outlet air amount to/from the compressor 1, and the generated cold air and warm air are delivered to the cold air conduit 9 and the warm air conduit 10 respectively. It is preferable that a silencer is attached to the periphery of the handle 17 so that operation noises can be prevented.

It is designed such that the air remaining in the tube body 5 can be pushed back to the central part inside the tube body 5 and the air is forcedly turned by the warm air flow 15 and moved toward the cold air outlet port 7.

At that time, the bushed back air is reduced in speed while expanding and acts on the outer side warm air flow 15, thereby enabling to form air having a higher temperature at its outer area and a lower temperature at its central area.

In this way, the vortex tube 4 can produce cold air and warm air out of compressed air.

The pre-pressure vessel 18 having a cylindrical shape is disposed in the vicinity of the vortex tube 4. Both ends of the pre-pressure vessel 18 are, respectively, blocked with curved surface plates 18a, 18b each having a projecting surface. The curved surface plate 18a disposed at an upper position thereof is connected with the cold air conduit 9 and the warm air conduit 10 which are spaced apart from each other.

The cold air conduit 9 is arranged inside the pre-pressure vessel 18 so as to act as a cooling tube 19. The cooling tube 19 is constructed by winding an aluminum or stainless steel tube, which is excellent in thermal conductivity, in a coil shape. A lower end of the cooling tube 19 is disposed at a bottom of the pre-pressure vessel 18.

Although the cooling tube 19 is wound in a coil shape in this embodiment, it may be bent in a zig-zag shape or U shape so that its occupation area can be downsized.

The end of the warm conduit 10 is disposed at an upper end part inside the pre-pressure vessel 18 such that the warm air contained therein can be discharged into the pre-pressure vessel 18. After the warm air is discharged, the water vapor contained in the warm air is condensed on a peripheral surface of the cold air conduit 9 so as to be dehumidified, thereby enhancing drying.

Therefore, the pre-pressure vessel 18 is provided at its bottom part with a drain valve (not shown) so that the condensed water pooled in the bottom part of the pre-pressure vessel 18 can be discharged.

In this way, the inside of the pre-pressure vessel 18 is filled with warm air, and the warm air is cooled by the cooling tube 19 arranged inside the pre-pressure vessel 18 so as to be heat exchanged, thereby rapidly cooling the warm air so as to be turned into a weak cold air. Then, the cold air is rapidly increased in temperature and the water vapor in the warm air is condensed on the surface of the cooling tube 19 which is formed in an elongated shape, so as to strongly enhance the dehumidification of the warm air.

The pre-pressure vessel 18 is provided with a lead-out tube 20 projecting from its lower peripheral surface and communicating with the cooling tube 19. The pre-pressure vessel 18 is further provided with an expansion tube 21 projecting from its position proximate to the tube 20 and communicating with the pre-pressure vessel 18. The lead-out tube 20 and the expansion tube 21 are connected to a pressure vessel 22 disposed in the vicinity of the pre-pressure vessel 18 so that the cold air and the warm air are mixed with each other.

The pressure vessel 22 mixes the cold air and the warm air introduced therein with each other, so that such mixed air is adjusted in a predetermined temperature and moisture, and then, delivers the adjusted air into an external air lead-out tube 23.

One end of the air lead-out tube 23 is connected to an air dryer 25 as a gas-liquid separator disposed inside a dry box 24, thereby enabling the gas-liquid separation of the introduced mixed-gas.

The dry box 24 is spaced apart from the pressure vessel 22. The box 24 is formed in a hollow housing having a bottom. The box 24 is partitioned its periphery by a front surface plate 26, right and left side surface plates 27, 28, an upper surface plate 29, a bottom surface plate 30 and a rear surface plate 31 which are formed of a thin steel plate, and the respective boundary portions thereof excluding the rear surface plate 31 are welded.

The dry box 24 adopted in this embodiment has a vertical length 470 through 500 mm, a lateral length 300 through 360 mm, a depth length 160 through 300 mm and a weight 9 through 15 kg, so that it can easily be carried.

The front surface plate 26 is provided at an upper part thereof with a tapered surface 26a, on which a pair of pressure gauges 32, 33 are disposed. By the pressure gauges 32, 33, the pressure of the compressed air, which is not yet separated into gas and liquid, introduced into the dry box 24 and the pressure of the compressed air, which is already separated into gas and liquid by the air dryer 25, can be measured.

In FIGS. 1 through 4, reference numeral 34 denotes a handle having an inversed U-shape mounted on the upper surface plate 29, and 35 denotes legs attached to the four corners of the bottom surface plate 30, enabling to adjust the height with respect to a mounting surface 36.

The air dryer 25 is formed in an elongated cylindrical shape. A plurality of partitions (not shown) are superimposed within the air dryer 25 such that one partition is placed on another. The compressed air is introduced from the lower side of the partitions in a bypassing manner and ejected through apertures (not shown) formed in the partitions such that the ejected air-flow collides with the partition just thereabove in order to condense the moisture in the condensed air. The condensed moisture is introduced into a drain device 37 and discharged outside from a drainage tube 38.

On the other hand, the dried compressed-air separated into gas and liquid by the air dryer 25 is delivered to an air feed pipe 39. Then, the dried compressed-air is fed to an air tool 40 such as an air driver, impact wrench, painting gun or the like.

Such constructed method for cooling a compressed air and apparatus thereof according to the present invention requires to make, as a cooling device, the vortex tube 4 and the prepressure vessel 18, the pressure vessel 22 and the dry box 24.

The vortex tube 4 may be formed in shape and dimension based on the known vortex tube. Its discharge amount of air is set to at least 1000 L/min or more. With the use of the cooling air 80%, compressed air of the inlet air pressure 0.7 Mpa is introduced into the vortex tube 4 from the air tank 2, and cold air and warm air are generated from both sides of the vortex tube 4.

In case no vortex tube satisfying the above-mentioned conditions can be obtained, it is also acceptable that a plurality of vortex tubes each having the same or different capability are connected in parallel.

The pre-pressure vessel 18 is formed in a hollow cylindrical shape having a large diameter. Both ends of the pre-pressure vessel 18, respectively, are blocked with curved surface plates 18a, 18b each having a projecting surface so that a pressure resisting structure is formed. The cold air conduit 9 and the warm air conduit 10, which are connected to both sides of the vortex tube 4, are connected to the curved surface plate 18a in a mutually spaced apart relation.

The end part of the cold conduit 9 is placed inside the pre-pressure vessel 18 in an extended manner as the cooling tube 19. The cooling tube 19 is constructed by winding an aluminum or stainless steel tube, which is excellent in thermal conductivity, in a coil shape. A lower end of the cooling tube 19 is disposed at a bottom of the pre-pressure vessel 18, while a distal end thereof is projected outside of the pre-pressure vessel 18 so as to form the lead-out tube 20.

In this case, instead of winding the cooling tube 19 in a coil shape, it may be bent, for example, in a zig-zag shape or U shape. By doing so, the occupation area of the cooling tube 19 can be downsized.

The distal end part of the warm air conduit 10 arranged inside the curved surface plate 18a in such a manner as to be spaced apart from the cold air conduit 9, so that the warm air in the warm air tube 10 can be discharged into the pre-pressure vessel 18.

In this case, the warm air discharged into the pre-pressure vessel 18 is cooled by the cooling tube 19 and the water vapor in the warm air is condensed on the surface of the cooling tube 19. Since the liquid drop is pooled in the bottom part of the pre-pressure vessel 18, the pre-pressure vessel 18 is provided at its bottom part with a drain valve (not shown).

The pre-pressure vessel 18 is provided with an expansion tube 21 projecting from a lower peripheral surface thereof, and the expansion tube 21 and the lead-out tube 20 are connected to the pressure vessel 22.

The pressure vessel 22 is formed in a cylindrical shape, and cold air and warm air are introduced therein from the lead-out tube 20 and the expansion tube 21 connected to its peripheral surface so that the cold air and warm air mixed with each other and heat exchanged so as to be adjusted to a desired temperature and moisture.

Then, one end of the air lead-out tube 23 is connected to the peripheral surface of the pressure vessel 22 and the other end is connected to the air dryer 25 received in the dry box 24.

The dry box 24 is formed in a vertically elongated hollow housing having a bottom. The periphery of the dry box 24 is partitioned by the front surface plate 26, the right and left side surface plates 27, 28, the upper surface plate 29, the bottom surface plate 30 and the rear surface plate 31. The weight of the dry box 24 is set to 9 through 15 kg. The dry box 24 is further provided on its upper surface plate 29 with the handle 34 so that it can be hand carried by the handle 34.

The front surface plate 26 is provided at its upper tapered surface 26a with a pair of pressure gauges 32, 33, so that the pressure of the mixed compressed air which is to be introduced into the dry box 24 and the pressure of the compressed air separated into gas and liquid by the air dryer 25 can be measured by the pressure gauges 32, 33.

The air dryer 25 is formed in an elongated cylindrical shape. A plurality of partitions (not shown) are superimposed inside the air dryer 25 such that one partition is placed on another. The compressed air is introduced from the lower side of the partitions in a bypassing manner and ejected through apertures (not shown) formed in the partitions such that the ejected air-flow collides with the partition just thereabove in order to condense the moisture in the compressed air. The condensed moisture is introduced into the drain device 37 and discharged outside from the drainage tube 38.

The dried compressed-air separated into gas and liquid by the air dryer 25 is delivered to the air feed pipe 39. Then, the dried compressed-air is fed to an air tool 40 such as an air driver, impact wrench, painting gun or the like.

Next, when installing the vortex tube 4 and the pre-pressure vessel 8, the pressure vessel 22 and the dry box 24, they are installed indoor or outdoor depending on the installing position of the air tank 2, the position where the air tool 40 is used, and their installing conditions.

For example, the vortex tube 4 is disposed at a spacing-apart position of the air tank 2, and the pre-pressure vessel 22 is disposed at a spacing-apart position of the vortex tube 4 and in a flat place either indoor or outdoor. The pressure vessel 22 is installed at a spaced-apart position of the pre-pressure vessel 18, and the dry box 24 is installed at a spaced-apart position of the pressure vessel 22. The dry box 24 is carried to an appropriate place by holding the handle 34 and installed in a predetermined installation surface 36.

At that time, it is preferable that the housing (not shown) containing the pre-pressure vessel 18 is disposed at a suitable place, indoor or outdoor, for example, the pre-pressure vessel 18, the vortex tube 4 and the pressure vessel 22 are arranged inside this housing, and they are piped so that they can be protected from rainwater.

It is also preferable that a silencer is attached to the periphery of the handle 17 of the vortex tube 4 in order to reduce the working noises during operation.

As described above, since the cooling tube 19 is would around in a coil shape and disposed inside the pre-pressure vessel 18, the cooling tube 19 can be increased in lengthwise dimension and the pre-pressure vessel 18 can be down-sized, the installation space can be reduced and the cooling capability can be increased. By virtue of the foregoing, the water vapor in the warm air within the pre-pressure vessel 8 can be increased in condensing amount, thereby enhancing drying.

Moreover, since the present invention does not require any cooling tub, cooling device of cooling water, freezing circuit and refrigeration type air dryer as required in the prior art, the equipment cost and operation cost can be reduced.

The pre-pressure vessel 18, the pressure vessel 22 and the dry box 24 are installed. After they are arranged, the air feed tube 39 is connected to the air dryer 25, and the other end thereof is connected to the air tool 40.

Under such circumstances, the air compressor 1 is actuated, the generated compressed-air is delivered into the air tank 2 and then, the compressed air is introduced into the vortex tube 4 from the tank 2.

The compressed air is introduced to the generator 11 to form a vortex flow, and this vortex flow is swirled inside the warm air chamber 13 and moved toward the warm air outlet port 8 side at a high speed.

At that time, the vortex flow is turned, while compressing the inner wall of the warm air chamber 13, by centrifugal force to rapidly increase the pressure and density, thereby increasing the temperature so that a part of the high temperature warm air flow is sent out toward the warm air outlet port 8 side.

On the other hand, the remaining compressed air is pushed back toward the center of the inside of the tube body 16 from this side and forcedly turned by the war air flow 15 and moved toward the cold air outlet port 7.

At that time, the pushed-back compressed-air is reduced in speed while expanding, and acts on the outside warm air flow 15, thereby forming air whose temperature is increased at its outside and decreased at its central part. In this way, cold air and warm air are generated at the both end parts of the vortex tube 4, and such generated cold air and warm air are sent out to the cold air conduit 9 and the warm air conduit 10, respectively and moved to the pre-pressure vessel 18.

Guided by the cooling tube 19 in the pre-pressure vessel 18, the end part of the cold air conduit 9 is moved to the bottom part of the pre-pressure vessel 18. On the other hand, the end part of the warm air conduit 10 is arranged at an upper end part within the pre-pressure vessel 18 and the warm air in the conduit 10 is discharged into the pre-pressure vessel 18.

In this way, the inside of the pre-pressure vessel 18 is filled with the warm air. This warm air is cooled by radiant heat of the cooling tube 19 which is arranged within the pre-pressure vessel 18. By heat exchange thereof, the warm air is rapidly cooled and turned into weak cold air, and the weak cold air is rapidly increased in temperature.

So, the water vapor in the warm air is condensed on the surface of the cooling tube 19 so that drying of the warm air is strongly enhanced. The liquid drop condensed on the surface of the cooling tube 19 is flowed down to the bottom part of the pre-pressure vessel 18 and discharged by a drain valve (not shown).

Then, the warm air within the pre-pressure vessel 18 is cooled and moved to the pressure vessel 22 from the expansion tube 21. At the same time, the cold air within the cooling tube 19 is moved from its end part to the pressure vessel 22 via the lead-out tube 20. The warm air and the cold air are mixed with each other within the pressure vessel 22 and adjusted in predetermined moisture and temperature.

Thereafter, the mixed air is delivered to the air lead-out tube 23 and moved to the air dryer 25 within the dry box 24.

The air dryer 25 introduces the compressed air from the lower side of the partitions (not shown) which are superimposed therein such that one partition is placed on another, ejects the introduced air through the apertures (not shown) of the partitions such that the compressed air collides with the partition just thereabove, so that the compressed air is caused to get adiabatic expansion and cooled and the moisture in the compressed air is condensed and separated into gas and liquid and dried.

The dried low-temperature compressed air is delivered to the air feed tube 39 and then fed to the air tool 40 from the air feed tube 39.

As apparent from the above description, according to the present invention, the warm air generated in the vortex tube 4 is introduced into the pressure vessel 22 and then cooled by the cold air generated in the vortex tube 4 so as to be turned into weak cold air. By mutually effectively utilizing the generated warm air and cold air, the cooled warm air is introduced into the pressure vessel 22 together with the cold air and mixed with each other therein, thereby generating a dried compressed air having a low temperature.

At that time, since the warm air turned into weak cold air by cooling and the cold air are introduced into the pressure vessel 22, mixing operation within the pressure vessel 22 can be more smoothly and rapidly performed compared with the case where, for example, the cold air and warm air generated in the vortex tube 4 are directly introduced into the pressure tube 22 and mixed with each other. Moreover, a low temperature and stable compressed air having a uniform and even temperature distribution can be generated and such generated compressed air can be fed toward the downstream side of the pressure vessel 22.

Moreover, according to the present invention, the water vapor in the warm air within the pre-pressure vessel 18 is condensed and dehumidified on the surface of the cooling tube 19 or a cooling chamber, as later described, into which the cold air is introduced, the dehumidified cooled warm air is introduced into the pressure vessel 22 from the pre-pressure vessel 18, and the low temperature dried compressed air adjusted in the pressure vessel 22 is fed toward the downstream side, thereby enabling to rationally effectively utilize the warm air and cold air generated in the vortex tube 4.

Therefore, a low temperature, uniform, even and stable dehumidified or dried compressed air can be obtained within the pressure vessel 22 compared with the case where the cold air and warm air generated in the vortex tube 4 are directly introduced into the pressure tube 22, and thus obtained compressed air is fed toward the downstream side of the pressure vessel, so that the air tool 40 can be prevented from failure and functional reduction.

FIGS. 5 through 12 shows other embodiments of the present invention, wherein like parts of the above-mentioned first embodiment are denoted by like reference numerals.

Figures 4, 5:
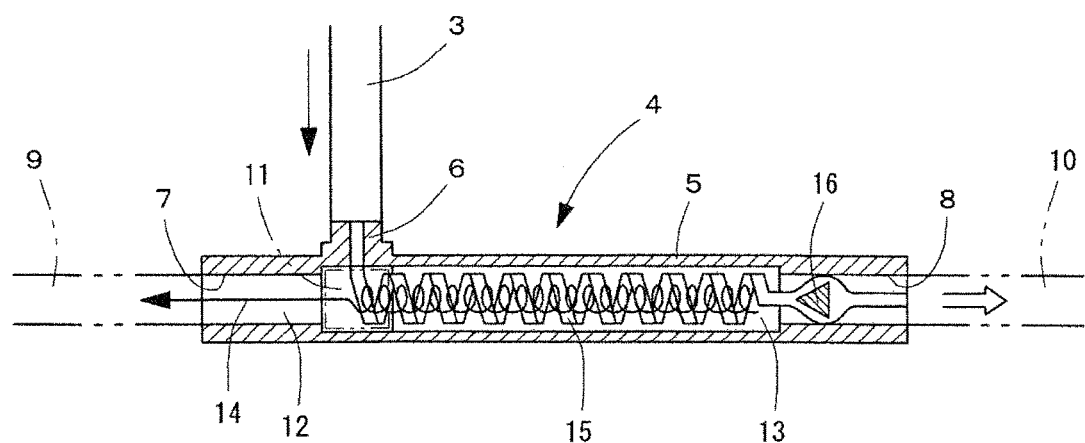
FIG. 4 is an enlarged sectional view showing the vortex tube which is applied to the present invention.
FIG. 5 is a front view showing, partly in section, the outline of a compressed air cooling device according to a second embodiment of the present invention.

FIG. 5 shows a second embodiment of the present invention. In this embodiment, a cooling tube 19 arranged within a pre-pressure vessel 18 is provided at an entire outer peripheral surface thereof with a trap fin 41 such that the contact area of the trap fin 41 with respect to a warm air introduced into the pre-pressure vessel 18 from a warm air conduit 10 is increased and cooling of the warm air is enhanced, and water vapor in the warm air is condensed on the trap fin so that dehumidification or drying can be enhanced.

Figure 6:
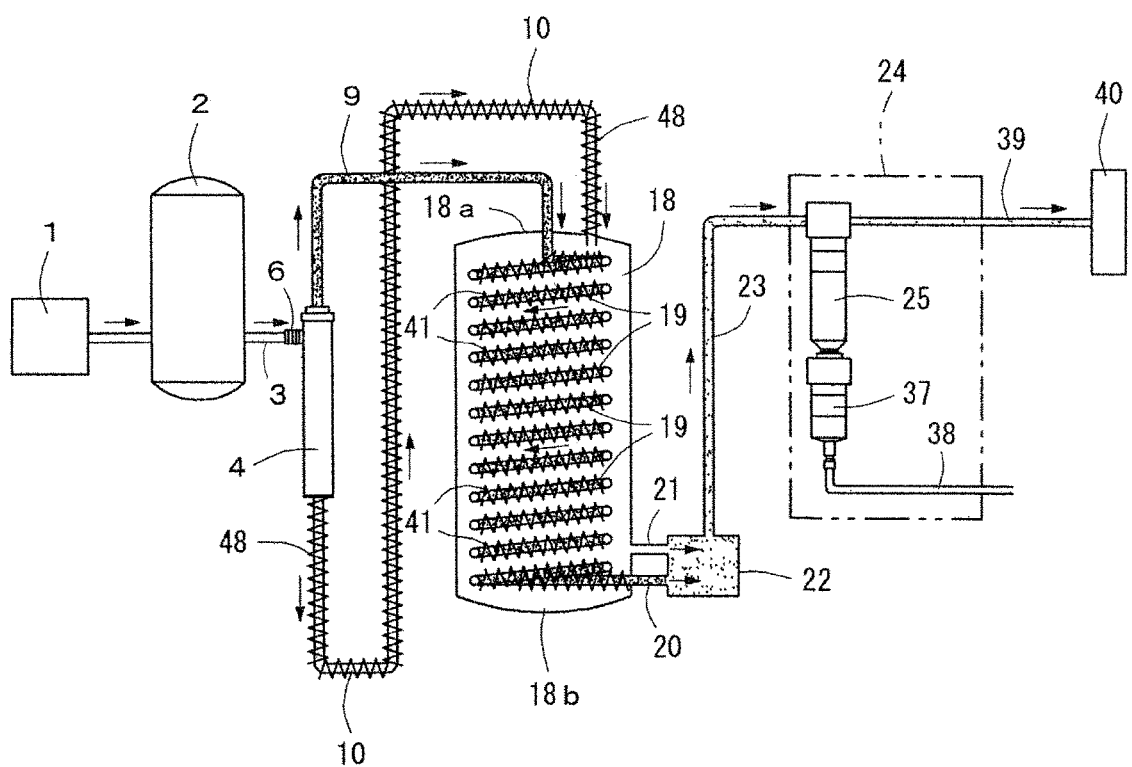
FIG. 6 is a front view showing, partly in section, the outline of a compressed air cooling device according to a third embodiment of the present invention.

FIG. 6 shows a third embodiment of the present invention. This embodiment is a modification of the second embodiment, wherein a warm air conduit 10 adapted to connect a warm air side outlet port of a vortex tube 4 and a pre-pressure vessel 18 with each other is provided at an entire outer peripheral surface thereof with a heat radiating fin 48 so that heat radiation of the warm air conduit 10 can be achieved, thereby enhancing cooling of the warm air conduit 10, and water vapor in the warm air within the pre-pressure vessel 18 is condensed on the trap fin 41, so that dehumidifying operation or drying operation with respect to the warm air can be easily performed.

Figure 7:
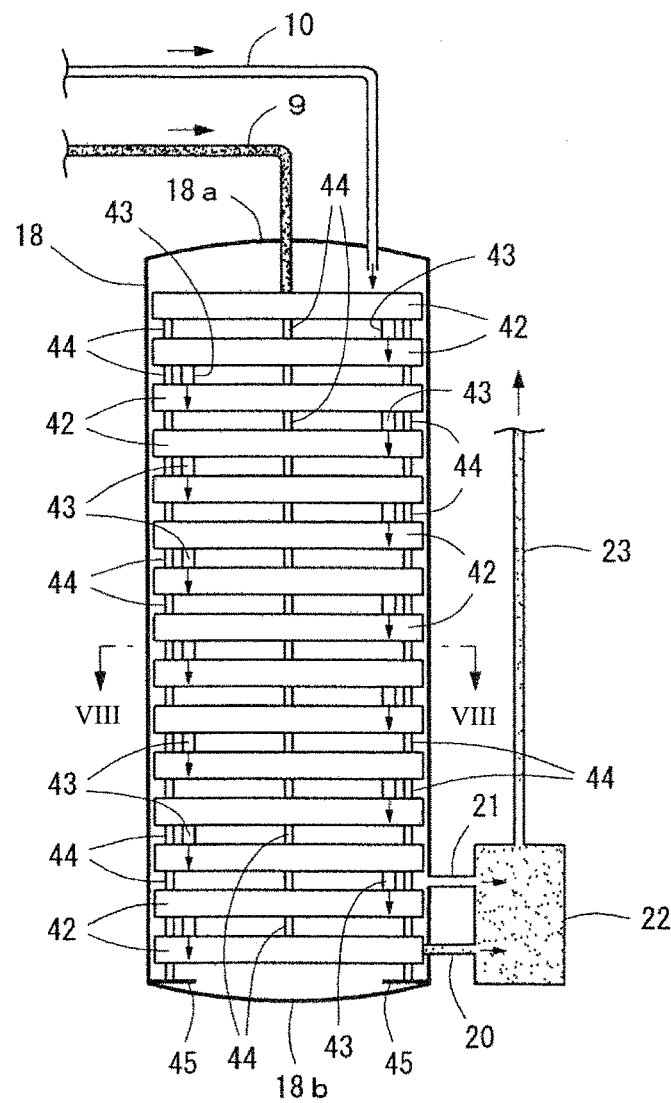
FIG. 7 is an enlarged sectional view showing the interior of a pre-pressure vessel according to a fourth embodiment of the present invention.
Figure 8:
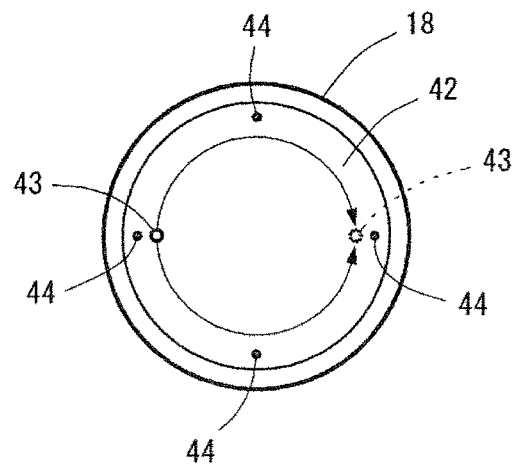
FIG. 8 is a sectional view taken on line VIII-VIII of FIG. 7.

FIGS. 7 and 8 show a fourth embodiment of the present invention. In this embodiment, instead of the cooling tube 19, one or a plurality of cooling chambers 42 each having a larger capacity the cooling tube 19 are vertically spacedly arranged within the pre-pressure vessel 18 and one end part of a cold air conduit 9 is connected to the uppermost cooling chamber 42 such that the vertically adjacent cooling chambers 42 thereunder can be communicated with each other through a conduit 43 having a reduced diameter.

Each cooling chamber 42 of this embodiment is formed in a flat hollow cylindrical shape and provided at diameterwise one end parts of upper and lower surfaces thereof with conduits 43, 43 projecting upward or downward, so that a large amount of cold air can be fed to or discharged from the vertically arranged cooling chambers 42.

Each cooling chamber 42 is provided at an equal angular position of a lower surface thereof with a plurality of support legs 44 projecting therefrom such that each support leg 44 is placed on an upper surface of the cooling chamber 42 right thereunder. By properly fixing the support legs 42, the cooling chambers 42 are superimposed such that one chamber 42 is placed on another. In FIGS. 7 and 8, reference numeral 45 denotes a rigid support plate having a ring shape. The support leg 44 is placed on an upper surface of the support plate 45.

In this embodiment, warm air is introduced into the pre-pressure vessel 18 by the warm air conduit 10 and cold air is introduced into the uppermost cooling chamber 42 by the cooling conduit 9. Such introduced cold air is gradually fed to the lower cooling chambers 42 through the conduits 43, 43 so that water vapor in the warm air is condensed on a peripheral surface of each cooling chamber 42, thereby achieving dehumidification and drying.

At that time, since the cooling chamber has a large capacity, a large amount of cold air can be introduced therein, and cooling of the inside of the pre-pressure vessel 18 can be enhanced by a large peripheral surface of the chamber 42. On the peripheral surface of the chamber 42 thus cooled, the water vapor in the warm air introduced into the pre-pressure vessel 18 is condensed and dehumidified.

Then, the warm air introduced into the pre-pressure chamber 18 is rapidly cooled and thus cooled warm air is moved to the pressure vessel 22 from the expansion tube 21. At the same time, the cold air within the chamber 42 is moved to the pressure vessel 22 from the lead-out tube 20. The warm air and cold air are mixed with each other and adjusted to a dried compressed air having a low temperature.

Thereafter, the dried compressed-air having a low temperature is moved to the air dryer 25 through the compressed air lead-out tube 23 and separated into gas and liquid by the dryer 25, so that cooled clean compressed-air having a low temperature can be fed to the air tool 40.

Figure 9:
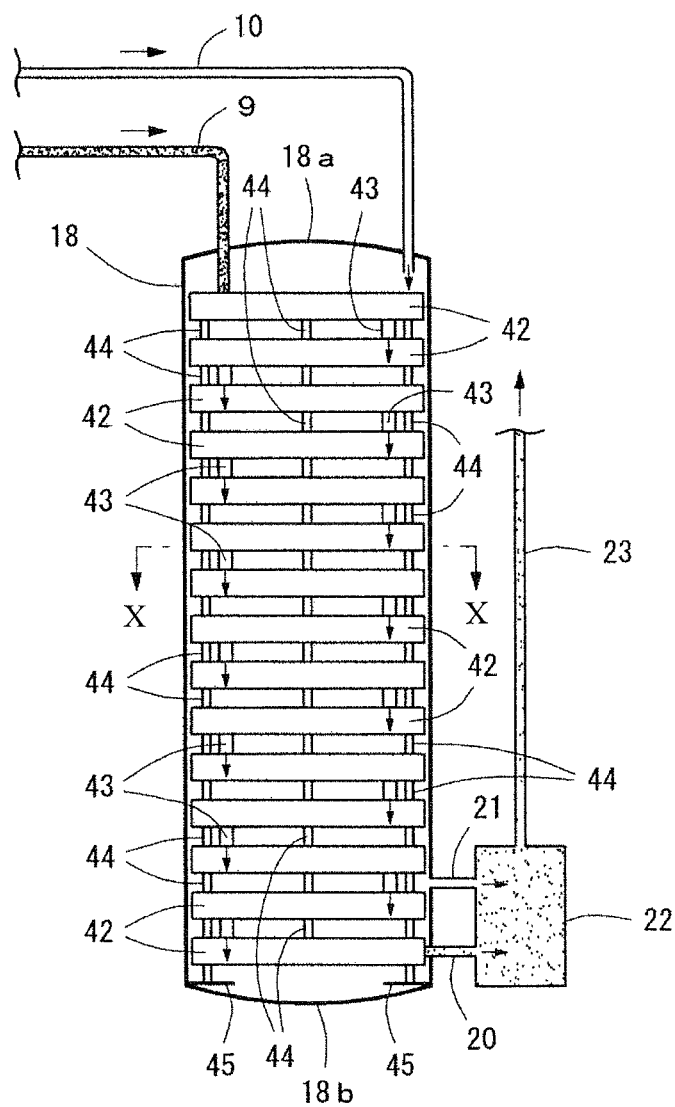
FIG. 9 is an enlarged sectional view showing the interior of a pre-pressure vessel according to a fifth embodiment of the present invention.
Figure 10:
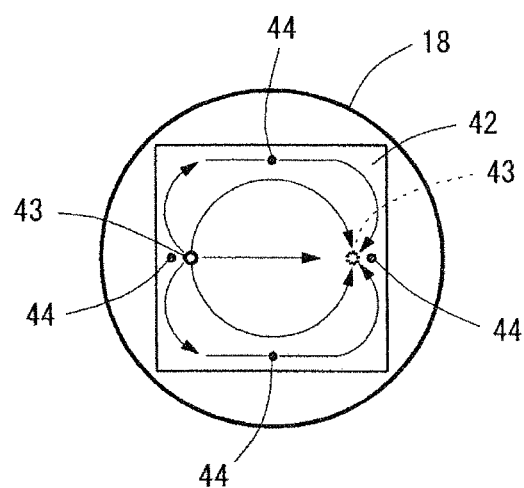
FIG. 10 (a) is a sectional view taken on line X-X of FIG. 9 and FIG. 10 (b) is a modified embodiment of FIG. 10 (a).
Figure 10:
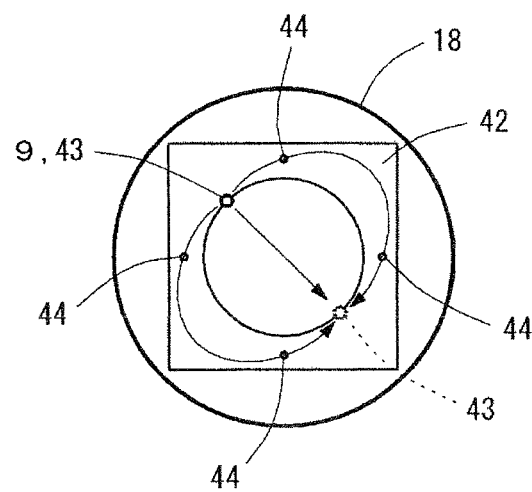

FIGS. 9 and 10 show a fifth embodiment of the present invention. This embodiment is an application embodiment of the fourth embodiment. Instead of forming the cleaning chamber 42 of the fourth embodiment in a flat cylindrical body, the chamber 42 is formed in the shape of a housing having a flat square shape or the like. A pair of conduits 43, 43 are arranged in opposing positions within the cooling chamber 42 such that the conduits 43, 43 face upward or downward. A cold air conduit 9 is coaxially arranged with the conduits 43, 43 and connected to the uppermost cooling chamber 42.

In this embodiment, the cooling chamber 42 is formed in the shape of a housing having a flat square shape. A part of the cold air introduced from the cold air conduit 9 or conduit 43 is pooled at the four corners of the cooling chamber 42, the moving speed of the cold air is restrained and such restrained cold air is introduced into a dry box 24 so that the gas-liquid separating operation performed by the air dryer 25 can be made precisely and delicately.

FIG. 10(b) is a modified embodiment of FIG. 10(a). In this modified embodiment, the cold air conduit 9 and the conduit 43 are arranged on the diagonal line of the cooling chamber 42 so that the formation of pool at the four corner parts can be promoted and the restraining operation can be enhanced. In this modified embodiment, the manner how to cool and how to dehumidify or dry the warm air is substantially same as the forth embodiment.

Figure 11:
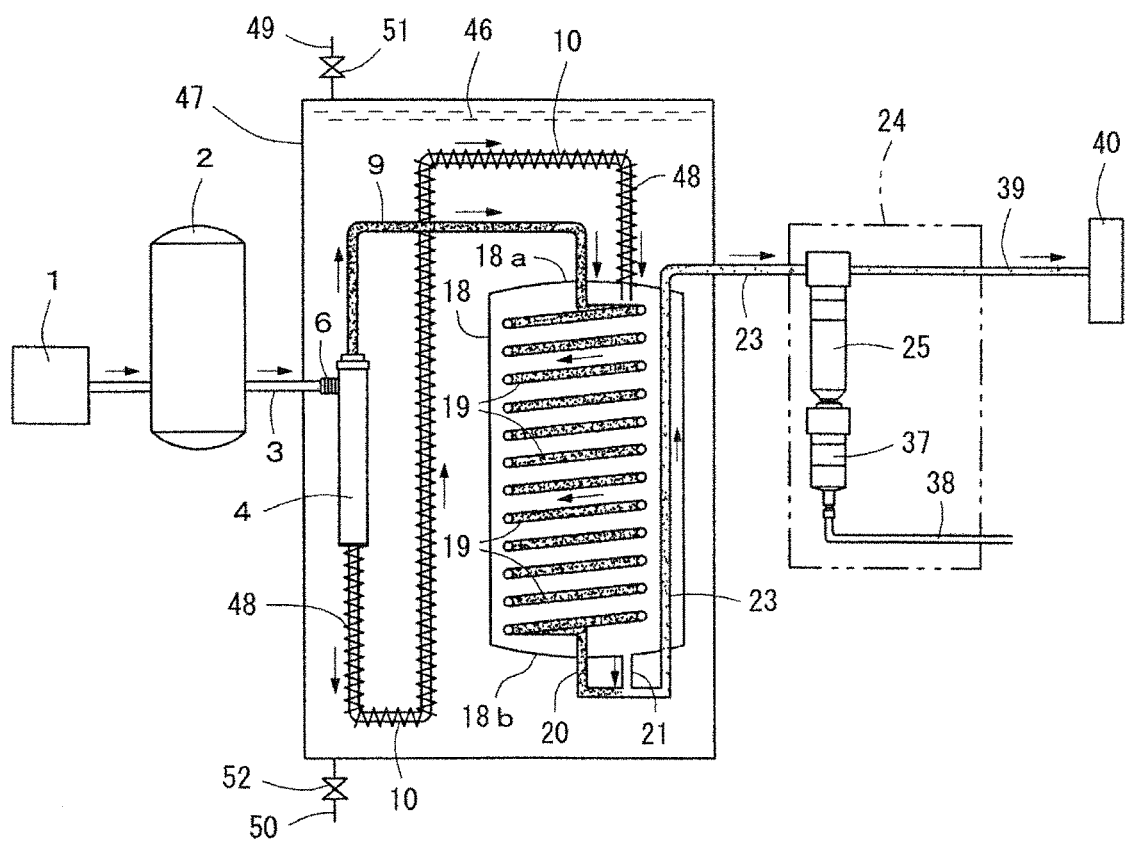
FIG. 11 is a front view showing, partly in section, the outline of a compressed air cooling apparatus according to a sixth embodiment of the present invention.

FIG. 11 shows a sixth embodiment of the present invention. In this embodiment, a large-sized cooling tank 47 containing therein water 46 as a coolant is installed between an air tank 2 and a dry box 24. A downstream part of a compressed air conduit 3 and a vortex tube 4, a cold air conduit 9 and a warm air conduit 10, a pre-pressure vessel 18 with a cooling tube 19 or a cooling chamber 42 disposed therein, a lead-out tube 20 and an expansion tube 21 projecting from the bottom part, and an upstream part or an intermediate stream part of an air lead-out tube 23 are arranged inside the cooling tank 47 such that they are all immersed in water 46 contained in the cooling tank 47 so as to be cooled Moreover, the warm air conduit 10 is provided at an entire outer peripheral surface thereof with a heat radiating fin so that heat radiation from the warm air conduit 10 to the water 46 is enhanced through the fin 48, thereby enhancing the cooling of the warm air conduit 10 and the cooling of the warm air.

Furthermore, the lead-out tube 20 and the expansion tube 21, and the upstream part or intermediate part of the air lead-out tube 23 are arranged within the pre-pressure vessel 18, so that heat absorption readily occurred when those members are arranged outside the pre-pressure vessel 18 can be avoided, thereby enhancing the cooling thereof. The dry air having a low temperature is then introduced to the air dryer 25 and separated into gas and liquid, and the cooled clean compressed-air having a low temperature is fed to an air tool 40.

In this embodiment, the warm air is cooled by cooling the various component members, condensation of the water vapor in the warm air is enhanced by the cooling tube 19, and dehumidification of drying of the compressed air is enhanced.

On the other hand, in this embodiment, the construction is simplified by omitting the pressure vessel 22, and the installation space of the pre-pressure vessel 22 and the upstream part or intermediate stream part of the air lead-out tube 23 is reduced so that the overall system can be downsized and the manufacturing cost can be reduced.

Figure 12:
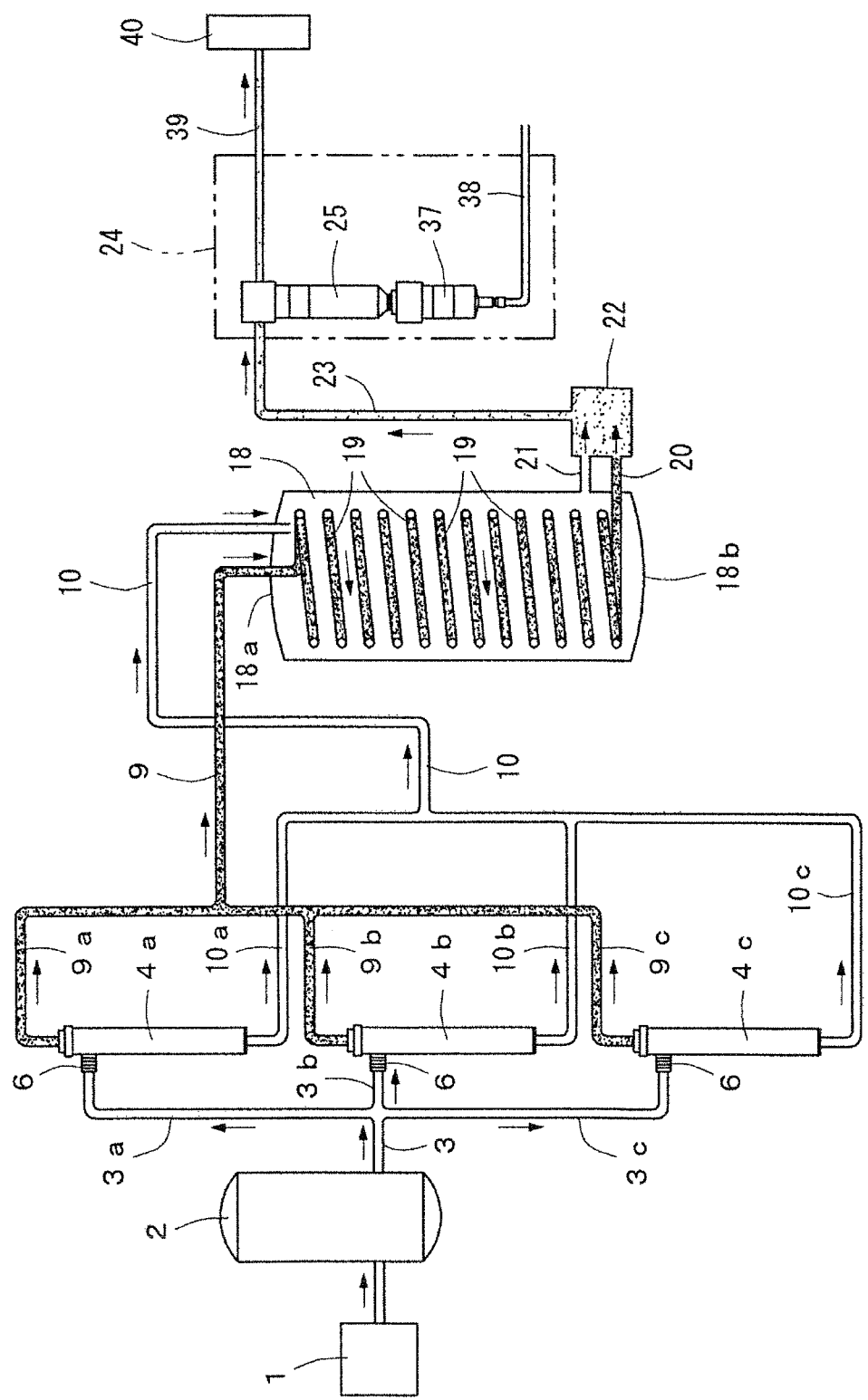
FIG. 12 is a front view showing, partly in section, the outline of a compressed air cooling apparatus according to a seventh embodiment of the present invention.

FIG. 12 shows a seventh embodiment of the present invention. In this embodiment, a plurality of branch conduits 3a through 3c are connected to a downstream part of a compressed air conduit 3, and a plurality of vortex tubes 4a through 4c each having the same or different capability in, for example, inlet air amount and/or outlet air amount are connected to the branch conduits 3a through 3c. The vortex tubes 4a through 4c are arranged in parallel within the compressed air conduit 3.

Cold air branch tubes 9a through 9c and warm air branch tubes 10a through 10c are connected to both end parts of the vortex tubes 4a through 4c, the other end parts of them are converged and connected to a cold air conduit 9 and a warm air conduit 10 as a main passage, and the conduits 9, 10 are connected to one side of the pre-pressure vessel 18.

As described above, in this embodiment, the vortex tubes 4a through 4c are arranged in parallel at the feeding side of the compressed air conduit 3, the compressed air in the air tank 2 is introduced into the vortex tubes 4a through 4c so that cold air and warm air are generated in the vortex tubes 4a through 4c. The cold air and warm air are converged and introduced into the pre-pressure vessel 18. Owing to the vortex tubes 4a through 4c, processing capability is doubled, introduction and cooling processing of a large amount of compressed air and dehumidifying or drying processing is doubled, thereby enabling to meet with the demand for use of a large amount of compressed air in the manufacturing factory or the like.

In this case, by designing such the vortex tubes have the same or different capability, a suitable vortex tube can be selected among the vortex tubes 4a through 4c depending on using conditions, thereby enabling to obtain the best adjustment of the inlet air amount or outlet air amount.

In a method for cooling a compressed air and an apparatus thereof according to the present invention, since dried compressed-air having a low temperature obtained by effectively using warm air and cool air generated in a vortex tube and without using any refrigeration type air dryer is fed to the air dryer and after a favorable gas-liquid separation is achieved by the air dryer, the compressed air is fed to an air tool so that the failure and functional reduction of the air tool can be prevented, the present invention can be preferably used at the time when a large amount of high-temperature compressed air generated by an air compressor of a manufacturing factory or the like, for example, is fed to an air dryer.

The invention claimed is:

1. An apparatus for cooling a compressed air comprising an air compressor adapted to generate a compressed air, a vortex tube adapted to generate a cold air and warm air from the compressed air delivered from the air compressor, and a pressure vessel adapted to adjust temperature and moisture of the compressed air by introducing the warm air and cold air therein, the adjusted compressed air being feedable toward a downstream side of the pressure vessel, wherein a pre-pressure vessel communicated with a warm air outlet port of the vortex tube is disposed at an upstream side of the pressure vessel, a plurality of flat cooling chambers communicated with a cold air outlet port the vortex tube are disposed inside the pre-pressure vessel and the warm air is dehumidified and cooled, conduits are provided which introduce dehumidified warm air and cold air into the pressure vessel so as to adjust temperature and pressure of the combined warm and cold air, and a conduit is provided which introduces the adjusted combined air into a dry box disposed at a downstream side of the pre-pressure vessel, the dry box including an air dryer functioning as a gas-liquid separator wherein the combined air is separated into air and liquid, and wherein the apparatus is configured to feed the separated air to an air tool.

2. An apparatus for cooling a compressed air according to claim 1, wherein the vortex tube, the pre-pressure vessel with the cooling chambers disposed therein, a cold air conduit and a warm air conduit the communication of the plurality of flat cooling chambers with the cold air outlet port of the vortex tube is by connection of the pre-pressure vessel, and the vortex tube are immersed in a cooling tank containing a coolant.

3. An apparatus for cooling a compressed air according to claim 1, wherein the vortex tube comprises a plurality of vortex tubes connected in parallel relation to a feeding side of generated compressed air so that the compressed air can be introduced into the respective vortex tubes, conduits are configured to converge the cold air generated in the respective vortex tubes and introduce the cold air into the cooling chambers disposed inside the pre-pressure vessel, and conduits are configured to converge the warm air generated in the respective vortex tubes and introduce the warm air into the pre-pressure vessel so that the warm air contacts exterior surfaces of the cooling chambers and water vapor is condensed on the exterior surfaces of the cooling chambers so that the warm air is dehumidified and cooled, and conduits are configured to introduce such dehumidified warm air and cold air into the pressure vessel so as to adjust temperature and pressure of the combined warm and cold air.

4. The apparatus for cooling a compressed air according to claim 1, wherein the vortex tube comprises a plurality of vortex tubes each having the same or different capability.

5. The apparatus for cooling a compressed air according to claim 1, wherein the plurality of flat cooling chambers are vertically spacedly stacked at predetermined intervals within the pre-pressure vessel, each of the cooling chambers communicates with the cooling chambers vertically adjacent there to through respective conduits, and the communication of the plurality of flat cooling chambers with the cold air outlet port of the vortex tube is by connection of an uppermost of the cooling chambers with the cold air outlet port of the vortex tube.

6. The apparatus for cooling a compressed air according to claim 1, wherein the flat cooling chambers are each formed in a cylindrical shape or rectangular box-like shape.

* * * * *